United States Patent Office 3,224,937
Patented Dec. 21, 1965

3,224,937
SYDNONE-CONTAINING INSECTICIDAL
COMPOSITIONS AND METHODS
Paul F. Wiley, Indianapolis, Ind., assignor to Eli Lilly and
Company, Indianapolis, Ind., a corporation of Indiana
No Drawing. Filed Oct. 22, 1958, Ser. No. 768,831
5 Claims. (Cl. 167—33)

This invention relates to a novel method of killing insects and to novel insecticidal compositions.

The method provided by this invention comprises the application to an insect habitat of a composition containing as its insecticidal ingredient a sydnone represented by the following structure

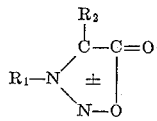

wherein $R_1$ is a radical of the group consisting of phenyl, chlorophenyl, tolyl, pyridyl and lower alkyl, and $R_2$ is a member of the group consisting of hydrogen, chlorine, bromine, and lower alkyl radicals. Thus for example, $R_1$ can be o-chlorophenyl, m-chlorophenyl, p-tolyl, 4-pyridyl, 2-pyridyl, ethyl, methyl, propyl and the like, and $R_2$ can be hydrogen, bromine, chlorine, ethyl, propyl and the like.

Illustrative sydnones which can be usefully employed as the active insecticidal ingredients in the novel compositions of this invention include: N-2-pyridyl sydnone, N-p-tolyl-C-methyl sydnone, N-o-tolyl sydnone, N-phenyl-C-n-propyl sydnone, N-isopropyl sydnone, N-methyl-C-methyl sydnone, N-m-chlorophenyl sydnone, and N-m-tolyl-C-ethyl sydnone.

In carrying out the processes of this invention there is applied to an insect habitat, for example, the foliage or other parts of the living plant, an insecticidal amount of a sydnone represented by the above formula. The insecticidal agent can be applied in pure or relatively pure form, that is, unmixed with other constituents. Such type of application is wasteful, however, in view of the highly effective nature of the agent, and hence the insecticidal properties of sydnones are preferably secured by the application to the insect habitat of a composition containing the sydnone as the active insecticidal agent dispersed in a suitable inert carrier, with or without other compatible fungicidal, bactericidal or insecticidal ingredients.

Sydnone-containing compositions are most satisfactorily formulated as wettable powders or dusting powders, although a water-in-oil emulsion can also be used. Those compositions which are adapted for direct spraying or dusting upon the insect habitat are prepared by methods well-known to the art, as for example, by mixing the sydnone with a non-phytotoxic diluent such as water plus a surface-active agent to provide a wettable powder, or such as clay, bentonite, silica, hydrous alumina, kieselguhr, or diatomaceous earth to provide a dusting powder, or such as ethanol or benzene plus a non-ionic emulsifying agent to provide a concentrate for use in aqueous emulsions. The dusting powder formulations are customarily used as such, but the wettable powders and emulsions are first prepared as concentrates and then further diluted with a non-phytotoxic material prior to use. The insectividally active sydnone is customarily present in the diluted dust or spray in a concentration varying from about .0025 percent to upwards of about 5 percent. The concentration of sydnone in concentrates used for preparing wettable powders and emulsions is necessarily far higher and can vary from 5 percent up to as high as 80 or 90 percent if desired. The above insecticidally-active compositions are applied to the insect habitat by means of spray guns, dust guns and the like.

The amount of sydnone to be applied for insect control purposes to a given area of plant life is, of course, dependent upon a variety of factors, such as the extent of vegetative surface to be covered, the severity of the insect infestation, the condition of the foliage treated, the temperature, the humidity, etc. In general, however, the application of about 0.1 to about 5.0 pounds of a sydnone represented by the above formula per acre of insect-infested plant life provides effective insecticidal action. The application to plant foliage to the point of run-off of aqueous compositions containing from about 0.0025 to about 5 percent on a weight-volume basis of a sydnone effectively controls the insecticidal life therein. Alternatively, a light but complete dusting of plant foliage with a dusting composition containing, by weight, about 0.0025 to about 5.0 percent of a sydnone also gives effective insecticidal control.

The compositions can also be so formulated as to contain other compatible insecticidal and fungicidal agents if desired, as for example, dichlorodiphenyltrichloroethane, N-(trichloromethylthio)-phthalimide, and the like.

Illustratively, a wettable powder concentrate containing an insecticidally active sydnone has the following ingredients:

|  | Parts |
|---|---|
| N-o-chlorophenyl sydnone | 100 |
| Diatomaceous earth | 100 |
| Sodium lauryl sulfate | 1.0 |
| Sodium lignin sulfate | 2.0 |

The above wettable powder concentrate is prepared by thoroughly mixing the ingredients after they had been ground sufficiently fine to pass a 325 mesh sieve. The concentrate is diluted 50 to 1 with water for use as an insecticidal spray.

An illustrative composition of an insecticidally-active dust containing a sydnone as the active ingredient has the following composition:

|  | Lbs. |
|---|---|
| N-phenyl sydnone | 1 |
| Talc | 1000 |

The N-phenyl sydnone is mixed with the talc after both ingredients have been ground finely enough to pass a 325 mesh sieve, and is then ready for application as a dust.

Sydnone-containing insecticidally active compositions such as the above or their equivalents are useful in controlling the insect population at the insect habitat. Among the insects which are controlled thereby are the strawberry spider mite, *Tetranychus atlanticus*, the two-spotted mite, *Tetranychus telarius*, the European red mite, *Metatetranychus ulmi*, and the clover mite, *Bryobia praetiosa*, aphids such as the pea aphid *Macrosiphum pisi*, beetles such as the Mexican bean beetle *Epilachna varivestis*, and worms such as the southern armyworm *Prodenis*

*eridania*. The compositions of this invention also have considerable activity in the higher ranges against the ova and embryonic forms of mites.

Insecticidally-active sydnones of this invention were made up into aqueous sprays according to the following descriptions and the sprays were tested against representative insects of the groups specified above.

.35 g. of N-ethyl sydnone were dissolved in 1 ml. of ethanol and the solution was mixed with 100 ml. of water to which had been added 1 ml. of "Triton" X–100 (an alkylaryl polyether alcohol surface-active agent sold by Rohm & Haas Co. of Philadelphia, Pennsylvania).

.35 g. of N-p-chlorophenyl sydnone and an equal quantity of a hydrous aluminum silicate such as that sold under the trademark "Pyrax" (manufactured by the R. T. Vanderbilt Co., New York, New York), were ground to a slurry in a mortar and pestle in the presence of a small quantity of water and a small quantity of "Triton" X–100. The slurry was then diluted to 100 ml. with distilled water.

N-phenyl-C-chloro sydnone, N-3-pyridyl sydnone, N-o-chlorophenyl sydnone, N-phenyl sydnone, and N-phenyl-C-methyl sydnone were formulated in the same way.

N-phenyl-C-methyl sydnone was also formulated by dissolving 0.2 g. of the compound in 1 ml. of benzene and mixing the solution with 200 ml. of water containing 1 ml. of "Triton" X–100.

More dilute formulations were prepared by diluting an aliquot of the above formulation with water as desired.

The above formulations were tested at the said concentrations, and at further dilutions as indicated, against late 3rd instar larvae of the southern armyworm as follows:

Lima bean plants were sprayed on the dorsal and ventral surfaces to the point of run-off with the sydnone-containing spray in various dilutions. The sprayed leaves were offered to the larvae for a 48-hour feeding period. The mortality was recorded at the end of this interval, and is set forth in Table I.

TABLE I

| Name of Sydnone | Dilution of spray | Percent Dead at 48 hrs. |
|---|---|---|
| N-phenyl-C-methyl sydnone | .35 | 100 |
|  | .1 | 15 |
| N-p-chlorophenyl sydnone | .35 | 80 |
|  | .1 | 20 |
| N-phenyl-C-chloro-sydnone | .35 | 80 |
|  | .1 | 60 |
|  | .05 | 50 |
| N-3-pyridyl sydnone | .35 | 90 |
|  | .1 | 20 |
| N-o-chlorophenyl sydnone | .35 | 80 |
|  | .1 | 20 |
|  | .05 | 10 |
| N-phenyl sydnone | .35 | 100 |
|  | .1 | 80 |
|  | .05 | 10 |
|  | .01 | 10 |

Various dilutions of the above-representative formulations containing an insecticidally-active sydnone were also tested against late 2nd instar larvae of the Mexican bean beetle. In this test, lima bean plants were sprayed on the dorsal and ventral surfaces to the point of run-off and were then offered to the larvae for a 48-hour feeding period. Table II sets forth the results of this test:

TABLE II

| Name of Sydnone | Dilution of spray | Percent Dead at 48 hrs. |
|---|---|---|
| N-phenyl sydnone | .1 | 40 |
| N-p-chlorophenyl sydnone | .35 | 80 |
|  | .1 | 10 |
| N-phenyl-C-chloro sydnone | .35 | 70 |
|  | .1 | 50 |
|  | .05 | 40 |

Sprays of various dilutions of the above formulations containing an insecticidally-active sydnone were tested for their activity against adult pea aphids as follows.

Pea aphids were sprayed and were then transferred to pea plants which had been previously sprayed with the same dilution of the sydnone and the number of dead aphids were counted after 48 hours. Ten aphids were used per test. Table III records the results of the test.

TABLE III

| Name of Sydnone | Dilution of Sydnone in the Spray | Percent Dead at 48 Hrs. |
|---|---|---|
| N-phenyl-C-methyl sydnone | .35 | 100 |
|  | .1 | 90 |
|  | .05 | 60 |
| N-p-chlorophenyl sydnone | .35 | 90 |
|  | .35 | 90 |
| N-phenyl-C-chloro sydnone | .1 | 90 |
|  | .05 | 70 |
|  | .01 | 10 |
| N-3-pyridyl sydnone | .35 | 90 |
|  | .1 | 60 |
|  | .05 | 30 |
| N-o-chlorophenyl sydnone | .35 | 100 |
|  | .35 | 70 |
| N-phenyl sydnone | .1 | 95 |
|  | .05 | 65 |
|  | .01 | 25 |

The activity of representative sydnones coming within the scope of the above formula against *Tetranychus atlanticus* mites was determined as follows.

Young, healthy lima bean plants were first infested with about 50 mites per plant and several hours later were sprayed on both the dorsal and ventral leaf surfaces to the point of run-off with sprays containing various dilutions of insecticidally-active sydnone, as formulated above. Five days later the treated plants were carefully inspected, the number of dead adult mites were counted, and the percentage of killed mites was determined. In addition, any ovicidal action was noted. Table IV gives the results of the test.

TABLE IV

| Name of Sydnone | Dilution in Percent | Percent of Mites Killed at 5 Days |
|---|---|---|
| N-phenyl-C-methyl sydnone | .35 | 100 |
|  | .1 | 57 |
|  | .05 | 50 |
|  | .01 | 31 |
| N-ethyl sydnone | .1 | 54 |
|  | .05 | 33 |
|  | .01 | 48 |
| N-p-chlorophenyl sydnone | .35 | 100 |
|  | .1 | 50 |
|  | .05 | 20 |
| N-phenyl-C-chloro sydnone | .35 | 100 |
|  | .1 | 100 |
|  | .05 | 85 |
| N-3-pyridyl sydnone | .35 | 90 |
|  | .1 | [1]90 |
|  | .05 | [1]80 |
|  | .01 | [1]40 |
| N-o-chlorophenyl sydnone | .35 | 100 |
|  | .1 | 100 |
|  | .05 | 100 |
|  | .01 | 100 |
|  | .0075 | 20 |
|  | .005 | 20 |
| N-phenyl sydnone | .35 | 100 |
|  | .1 | 100 |
|  | .05 | 76 |
|  | .01 | 35 |

[1] Ovicidal.

N-o-chlorophenyl sydnone was also tested against a second species of mite, *Tetranychus telarius*, by the same procedure. Table V gives the results of the test.

TABLE V

| Dilution of N-o-chlorophenyl Sydnone in the Spray | Percent of Mites Killed at 5 Days |
|---|---|
| .0075 | 32 |
| .005 | 32 |
| .0025 | 25 |

The sydnones used in the compositions and processes of this invention are non-phytotoxic and also have a very low toxicity for mammals. For example, the dose of N-o-chlorophenyl sydnone, as determined statistically, which would kill 50 percent of a group of mice when administered by the oral route was 423.8±20.8 mg./kg. of mouse weight. The dose of N-o-chlorophenyl sydnone, as determined statistically, which would kill 50 percent of a group of rats when administered by the oral route was 377.2±20.9 mg./kg. of rat weight.

The sydnones useful in this invention are readily prepared by reacting an N-substituted glycine with nitrous acid and acetic anhydride as exemplified in the following reaction scheme:

$$R_1-NH-\overset{R_2}{\underset{|}{C}}H-COOH + HNO_2 + (CH_3CO)_2O \longrightarrow$$

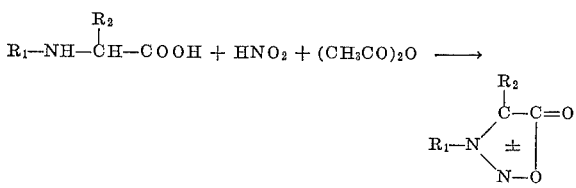

wherein $R_1$ and $R_2$ have the same significance as before. The substituted glycine itself can be prepared by reacting ethylchloro-acetate or ethyl-α-chloropropionate or ethyl-α-chlorobutyrate with an appropriately substituted amine such as aniline, o-chloroaniline or propylamine to give an ester of the substituted glycine. The ester can be readily hydrolyzed to the free acid which is used as a starting material in the above process.

The following examples illustrate the preparation of hitherto unknown sydnones.

EXAMPLE 1

*Preparation of N-o-chlorophenyl sydnone*

14 g. of N-o-chlorophenyl glycine were suspended in about 250 ml. of 18 M sulfuric acid and the mixture was cooled to about 0° C. 5.75 g. of sodium nitrite were added and the resulting mixture was cooled with stirring at about −5° C. for about 1.5 hours. The reaction mixture was then poured into about 1280 g. of ice. The aqueous mixture was extracted three times with 200 ml. portions of diethyl ether. The ethereal extracts were combined and dried, and the ether was distilled therefrom in vacuo. The residue comprising N-nitroso-N-o-chlorophenyl glycine was dissolved in about 170 ml. of acetic anhydride, and the mixture was allowed to stand at ambient room temperature for about two days. The reaction mixture was poured over about 1000 g. of ice. The N-o-chlorophenyl sydnone which precipitated was collected by filtration and was dried. It melted at about 82–84° C. *Analysis.*—Calculated: C, 48.87; H, 2.56; N, 14.25. Found: C, 48.72; H, 2.81; N, 14.04.

EXAMPLE 2

*Preparation of N-ethyl sydnone*

A solution containing 4.4 g. of sodium nitrite and 12 ml. of water was added dropwise over a period of about 30 minutes to a solution containing 7.69 g. of ethyl glycine hydrochloride in 35 ml. of water at a temperature of about −5° C. with stirring. After the addition had been completed, the reaction mixture was stirred for an additional two hours. The aqueous solution containing N-nitroso-N-ethyl glycine formed in the above reaction was extracted with 4 x 50 ml. portions of diethyl ether and the ethereal extracts were combined and were dried. Evaporation of the ether in vacuo left a solid, a pinkish-white residue of N-nitroso-N-ethyl glycine melting at about 84–87° C.

2 g. of N-nitroso-N-ethyl glycine and 13.5 ml. of acetic anhydride were mixed and were heated at about 100° C. for about one-half hour. The reaction mixture was cooled and was allowed to stand at ambient room temperature overnight after which time the excess acetic anhydride was removed in vacuo. The residue comprising N-ethyl sydnone was distilled. N-ethyl sydnone boiled at about 140° C. at a pressure of about 1.5 mm. of mercury. $n_D^{25} = 1.505$. *Analysis.*—Calculated: C, 42.11; H, 5.30; N, 24.56. Found: C, 42.15; H, 5.31; N, 24.06.

I claim:

1. The process of killing insects which comprises the application to an insect habitat of a composition containing as an active insecticidal ingredient a sydnone represented by the following formula:

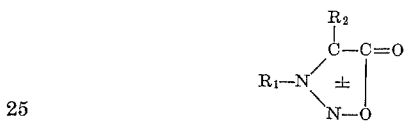

wherein $R_1$ is a radical of the group consisting of phenyl, chlorophenyl, tolyl, pyridyl and lower alkyl, and $R_2$ is a member of the group consisting of hydrogen, a halogen atom and lower alkyl radicals having from 1 to 3 carbon atoms.

2. The process according to claim 1 wherein the active insecticidal ingredient is N-o-chlorophenyl sydnone.

3. The process according to claim 1 wherein the insecticidally active ingredient is N-phenyl sydnone.

4. A method of controlling acarids and insects which comprises applying to acarids and insects and their habitats a toxic amount of a composition comprising a compound represented by the formula

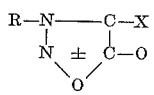

wherein R is a radical selected from the group consisting of phenyl and chlorophenyl and X is a member selected from the group consisting of hydrogen, halogen and methyl.

5. A composition comprising a phenylsydnone having the following structure

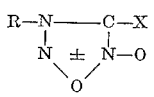

wherein R is a radical selected from the group consisting of phenyl and chlorophenyl and X is a member selected from the group consisting of hydrogen, halogen and methyl; a solvent for said sydnone and a wetting agent.

References Cited by the Examiner

FOREIGN PATENTS 740,213 10/1943 Germany.

OTHER REFERENCES

Baker et al.: J. Chem. Soc. (London), vol. 1949, pp. 307–314.

Baker et al.: J. Chem. Soc. (London), vol. 1950, pp. 1542–51.

Earl et al.: J. Chem. Soc. (London), vol. 1935, pp. 899–900.

Hill: J. Chem. Soc., vol. 1953, pp. 1482–90.

Schmidt: Chem. Abst., vol. 46, col. 2871 (1952).

FRANK CACCIAPAGLIA, Jr., *Primary Examiner.*

MORRIS O. WOLK, WILLIAM B. KNIGHT, JULIAN S. LEVITT, *Examiners.*